US010160334B2

(12) United States Patent
Houda et al.

(10) Patent No.: US 10,160,334 B2
(45) Date of Patent: Dec. 25, 2018

(54) POWER CONVERSION DEVICE AND MACHINE EQUIPPED WITH POWER CONVERSION DEVICE

(71) Applicant: Hitachi, Ltd., Chiyoda-ku, Tokyo (JP)

(72) Inventors: Isao Houda, Tokyo (JP); Masayoshi Takahashi, Tokyo (JP); Hiroki Funato, Tokyo (JP); Hitoshi Akiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 15/121,310

(22) PCT Filed: Dec. 8, 2014

(86) PCT No.: PCT/JP2014/082358
§ 371 (c)(1),
(2) Date: Aug. 24, 2016

(87) PCT Pub. No.: WO2015/145882
PCT Pub. Date: Oct. 1, 2015

(65) Prior Publication Data
US 2017/0015207 A1   Jan. 19, 2017

(30) Foreign Application Priority Data
Mar. 25, 2014   (JP) ................................ 2014-061112

(51) Int. Cl.
*H02M 3/156* (2006.01)
*B60L 11/18* (2006.01)
(Continued)

(52) U.S. Cl.
CPC ........... *B60L 11/1803* (2013.01); *H02M 1/44* (2013.01); *H02M 3/156* (2013.01); *H02M 7/44* (2013.01); *H02P 27/08* (2013.01)

(58) Field of Classification Search
CPC ........ H02M 1/44; H02M 3/145; H02M 3/155; H02M 3/156; H02M 3/135; G05F 1/56
(Continued)

(56) References Cited

U.S. PATENT DOCUMENTS 8,253,196 B2 *   8/2012   Lotfi .................. H01L 21/28518
257/334
2003/0151933 A1   8/2003   Haraguchi et al.
(Continued)

FOREIGN PATENT DOCUMENTS

JP    2003-244944 A    8/2003
JP    2006-288102 A   10/2006
(Continued)

OTHER PUBLICATIONS

Japanese-language Office Action issued in counterpart Japanese Application No. 2014-061112 dated Dec. 19, 2017 with English translation (Seven (7) pages).
(Continued)

*Primary Examiner* — Adolf Berhane
(74) *Attorney, Agent, or Firm* — Crowell & Moring LLP

(57) ABSTRACT

Provided is a power conversion device capable of selectively suppressing harmonic noise in a frequency band and a machine equipped with the power conversion device. The power conversion device includes a switching element (13), a switching signal generation unit (23, 24) for generating a switching control signal for controlling the turning on/off of the switching element (13), and a control unit (18), and is characterized in that the switching control signal generation unit (23, 24) generates the switching control signal including a combination of a pair of symmetrical pulse waveforms having on and off periods that are interchanged with respect to a repeated cycle.

9 Claims, 8 Drawing Sheets

(51) Int. Cl.
*H02M 1/44* (2007.01)
*H02M 7/44* (2006.01)
*H02P 27/08* (2006.01)

(58) Field of Classification Search
USPC ............... 323/265, 271, 273, 282, 283, 351
See application file for complete search history.

(56) References Cited

U.S. PATENT DOCUMENTS

| | | | |
|---|---|---|---|
| 2005/0168203 A1* | 8/2005 | Dwarakanath | H02M 3/1588 323/282 |
| 2006/0226710 A1 | 10/2006 | Kawasaki et al. | |
| 2007/0182392 A1* | 8/2007 | Nishida | H02M 3/156 323/282 |
| 2008/0211467 A1* | 9/2008 | Huang | H02M 3/1588 323/271 |
| 2011/0025240 A1* | 2/2011 | Furukawa | B60L 11/1803 318/400.3 |
| 2012/0086422 A1* | 4/2012 | Ito | H02M 3/156 323/284 |
| 2012/0306467 A1* | 12/2012 | Ohmaru | H02M 3/157 323/283 |
| 2013/0278071 A1 | 10/2013 | Komiyama | |
| 2014/0292298 A1* | 10/2014 | Pradhan | H02M 3/1588 323/286 |

FOREIGN PATENT DOCUMENTS

| | | |
|---|---|---|
| JP | 2009-254014 A | 10/2009 |
| JP | 2009-278753 A | 11/2009 |
| JP | 2011-49869 A | 3/2011 |
| JP | 2013-223409 A | 10/2013 |

OTHER PUBLICATIONS

International Search Report (PCT/ISA/210) issued in PCT Application No. PCT/JP2014/082358 dated Feb. 24, 2015 with English translation (6 pages).
Japanese-language Written Opinion (PCT/ISA/237) issued in PCT Application No. PCT/JP2014/082358 dated Feb. 24, 2015 (3 pages).

\* cited by examiner

FIG. 6

| ITEM NUMBER | AM RADIO SUB-BAND DURING LISTENING | ORDER OF HARMONIC | HARMONIC FREQUENCY | COMBINATION OF SYMMETRICAL DUTY RATIOS | |
|---|---|---|---|---|---|
| | | | | FIRST DUTY RATIO | SECOND DUTY RATIO |
| 1 | 450~550kHz | 5 | 500kHz | 20% (1/5) | 80% (4/5) |
| 2 | 550~650kHz | 6 | 600kHz | 16.666···% (1/6) | 83.333···% (5/6) |
| 3 | 650~750kHz | 7 | 700kHz | 14.286···% (1/7) | 85.714···% (6/7) |
| 4 | 750~850kHz | 8 | 800kHz | 12.5% (1/8) | 87.5% (7/8) |
| 5 | 850~950kHz | 9 | 900kHz | 11.111···% (1/9) | 88.888···% (8/9) |
| 6 | 950~1050kHz | 10 | 1000kHz | 10% (1/10) | 90% (9/10) |
| 7 | 1050~1150kHz | 11 | 1100kHz | 9.090···% (1/11) | 90.090···% (10/11) |
| 8 | 1150~1250kHz | 12 | 1200kHz | 8.333···% (1/12) | 91.666···% (11/12) |
| 9 | 1250~1350kHz | 13 | 1300kHz | 7.692···% (1/13) | 92.307···% (12/13) |
| 10 | 1350~1450kHz | 14 | 1400kHz | 7.142···% (1/14) | 92.857···% (13/14) |
| 11 | 1450~1550kHz | 15 | 1500kHz | 6.666···% (1/15) | 93.333···% (14/15) |
| 12 | 1550~1650kHz | 16 | 1600kHz | 6.25% (1/16) | 93.75% (15/16) |

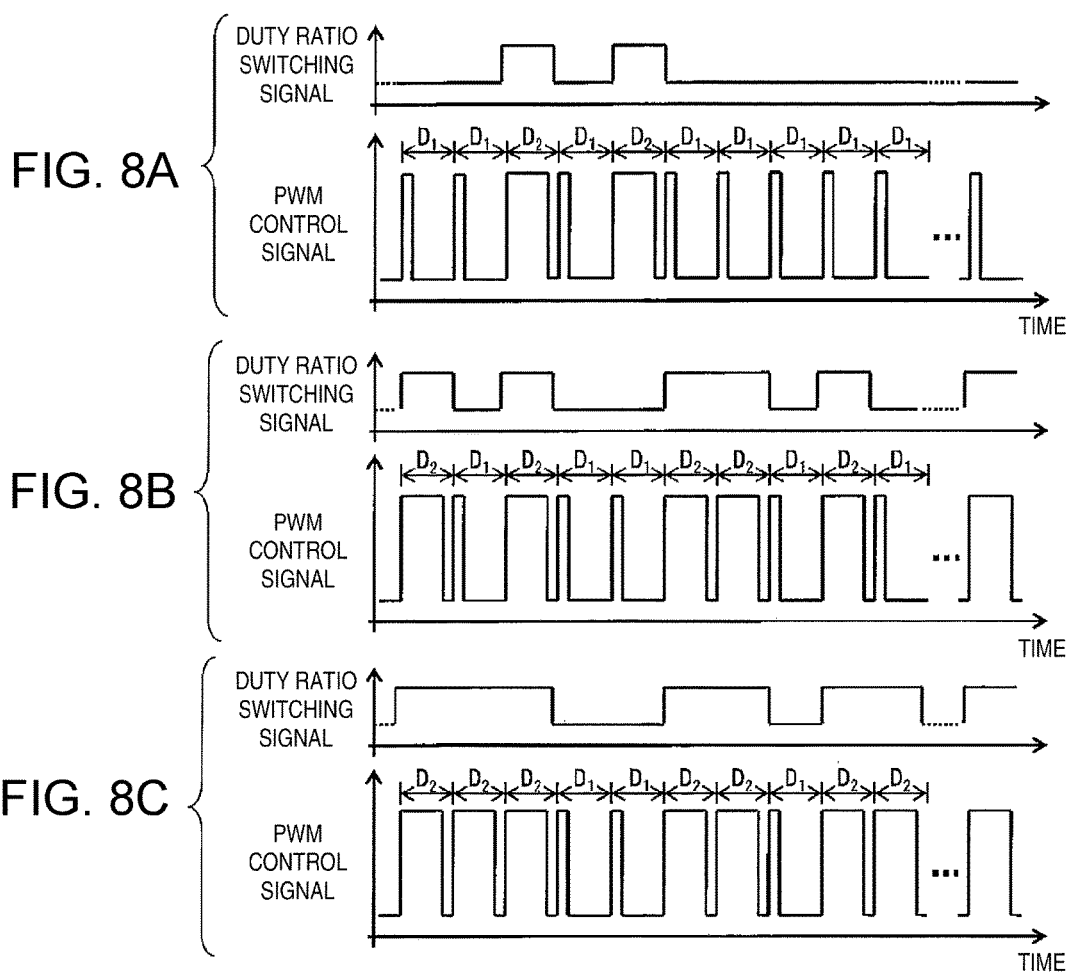

POWER CONVERSION DEVICE AND MACHINE EQUIPPED WITH POWER CONVERSION DEVICE

TECHNICAL FIELD

The present invention relates to a power conversion device and a machine equipped with the power conversion device.

BACKGROUND ART

JP-A-2006-288102 (Patent Literature 1) is an example of the background art of this technical field. This patent application states that a driving pulse for operating a power switching element is generated as the repetition of a basic pattern 1 or basic pattern 2; basic patterns 1 and 2 can be only used for respective usable duties; here, usable duties are duties in which switching frequencies formed by edges of driving pulses do not accord with each other; this leads to provision of a switching device capable of suitably reduce the peak value of noise due to switching control when controlling a control object to a desired amount of control (see abstract).

CITATION LIST

Patent Literature

PATENT LITERATURE 1: JP-A-2006-288102

SUMMARY OF INVENTION

Technical Problem

The above-described Patent Literature 1 describes the mechanism of a switching device that makes switching frequencies formed by an interval between start timings of on operation of a power switching element and an interval between start timings of off operation different from each other, then controls a control object to a desired amount of control, thereby spreads switching frequencies, and suitably reduces the peak value of noise due to switching control.

However, the switching device in Patent Literature 1 reduces the noise level of an overall radio broadcast band by spreading the switching frequencies, and its reduction effect is limited. Furthermore, it has a problem in which due to wiring and a grounding method when it is mounted on a system of an automobile or the like, a harmonic noise level at a particular order becomes higher, causing necessity to add a filter for suppressing noise over the overall radio broadcast band, making the device larger, and increasing costs.

Thus, an objective of the present invention is to provide a power conversion device capable of selectively suppressing harmonic noise in a frequency band, and a machine equipped with the power conversion device.

Solution to Problem

In order to solve the above-described problems, for example, a configuration described in the claims is adopted.

The present application includes a plurality of means for solving the above-described problems, but one example is a power conversion device comprising a switching element, a switching signal generation unit for generating a switching control signal for controlling turning on/off the switching element, and a control unit, wherein the switching control signal generation unit generates the switching control signal comprising a combination of a pair of symmetrical pulse waveforms having on and off periods that are interchanged with respect to a repeated cycle.

Advantageous Effects of Invention

The objective is to provide a power conversion device capable of selectively suppressing harmonic noise in a frequency band and a machine equipped with the power conversion device.

Problems, configurations, and effects other than those described above will be clear from the following explanation of embodiments.

BRIEF DESCRIPTION OF DRAWINGS

FIG. 6 is a list of frequency sub-bands in which a radio broadcast is being listened to, the orders of the harmonics at which a dip should be formed in the frequency characteristic, and combinations of used symmetrical duty ratios.

FIG. 8 is an example of PWM control signal selected by a switch.

DESCRIPTION OF EMBODIMENTS

Figure 1:
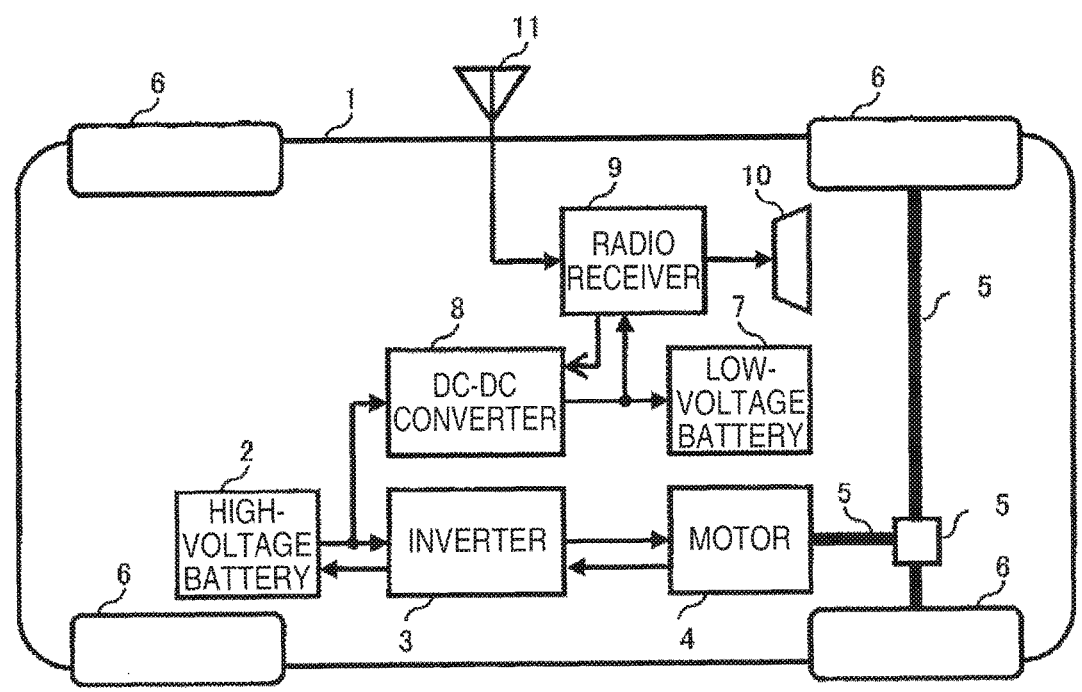
FIG. 1 is an example of configuration diagram of electric vehicles as a machine according to an embodiment.

Embodiments will be described below with reference to drawings. The same reference characters in the drawings indicate the same or corresponding parts. In addition, the present invention is not limited to shown examples.
Embodiment 1

In this embodiment, as a machine equipped with a power conversion device, an embodiment in which a DC-DC converter is mounted on an electric vehicle will be described with reference to FIGS. 1-8.

FIG. 1 is an example of configuration diagram of electric vehicles. An electric vehicle 1 in FIG. 1 comprises a high-voltage battery 2, an inverter 3, a motor 4, a driving force transmission unit 5, drive wheels 6, a low-voltage battery 7, a DC-DC converter 8, a radio receiver 9, a speaker 10, and a radio antenna 11.

In the electric vehicle 1, the high-voltage battery 2 stores electric energy, and outputs a high voltage of, for example, 360-420 V to supply it to the inverter 3 and the DC-DC converter 8. The inverter 3 converts the supplied high voltage into a three-phase AC signal by switching, and rotates the motor 4. The mechanical driving force of the motor 4 is transmitted to the drive wheels 6 by the driving force transmission unit 5 comprising a shaft and a differential gear.

The inverter 3 takes into account the driving state of the electric vehicle 1 and accelerator pedal operation by a driver, and adjusts electric energy supplied by the high-voltage battery 2 to control the output of the motor 4.

On the other hand, the motor 4 is able to generate electric power using driving force supplied by the drive wheels 6 and the driving force transmission unit 5 when the electric vehicle 1 slows down or the like. AC power generated by the motor 4 is converted into DC power by the inverter 3, and the DC power is stored in the high-voltage battery 3.

The DC-DC converter 8 in the electric vehicle 1 steps down the high voltage supplied by the high-voltage battery 2 to supply the resulting lower voltage to the low-voltage battery 7 and the radio receiver 9. Electric power stored in the low-voltage battery 7 is used as a power source for not only the radio receiver 9 but also electric components, such as wipers and headlights, in the electric vehicle 1.

In the electric vehicle 1, the radio receiver 9 receives a radio broadcast received by the reception antenna 11 mounted on the electric vehicle 1, and outputs the voice of the radio from the speaker 10. This radio receiver 9 has a function to mainly receive the AM radio broadcast and the FM radio broadcast.

Here, the AM radio broadcast modulates the amplitude of a carrier wave with radio voice. The radio receiver 9 detects and demodulates the modulated wave and outputs a voice signal to the speaker 10. The frequency band of the AM radio broadcast is, for example, 510-1720 kHz.

On the other hand, the FM radio broadcast modulates the frequency of a carrier wave with radio voice. The radio receiver 9 detects and demodulates the modulated wave and outputs a voice signal to the speaker 10. The frequency band of the FM radio broadcast is, for example, 76-108 MHz.

The radio receiver 9 supplies frequency information on a selected broadcast station to the DC-DC converter 8. The present invention does not limit the format and interface of the frequency information, but gives room to assume various formats, such as a method for supplying digital data indicating the frequency of a radio broadcast during listening, and a method for sectioning the overall frequency band of the radio broadcast into a plurality of sub-bands to supply digital data indicating which sub-band a radio broadcast during listening belongs to.

Figure 2:
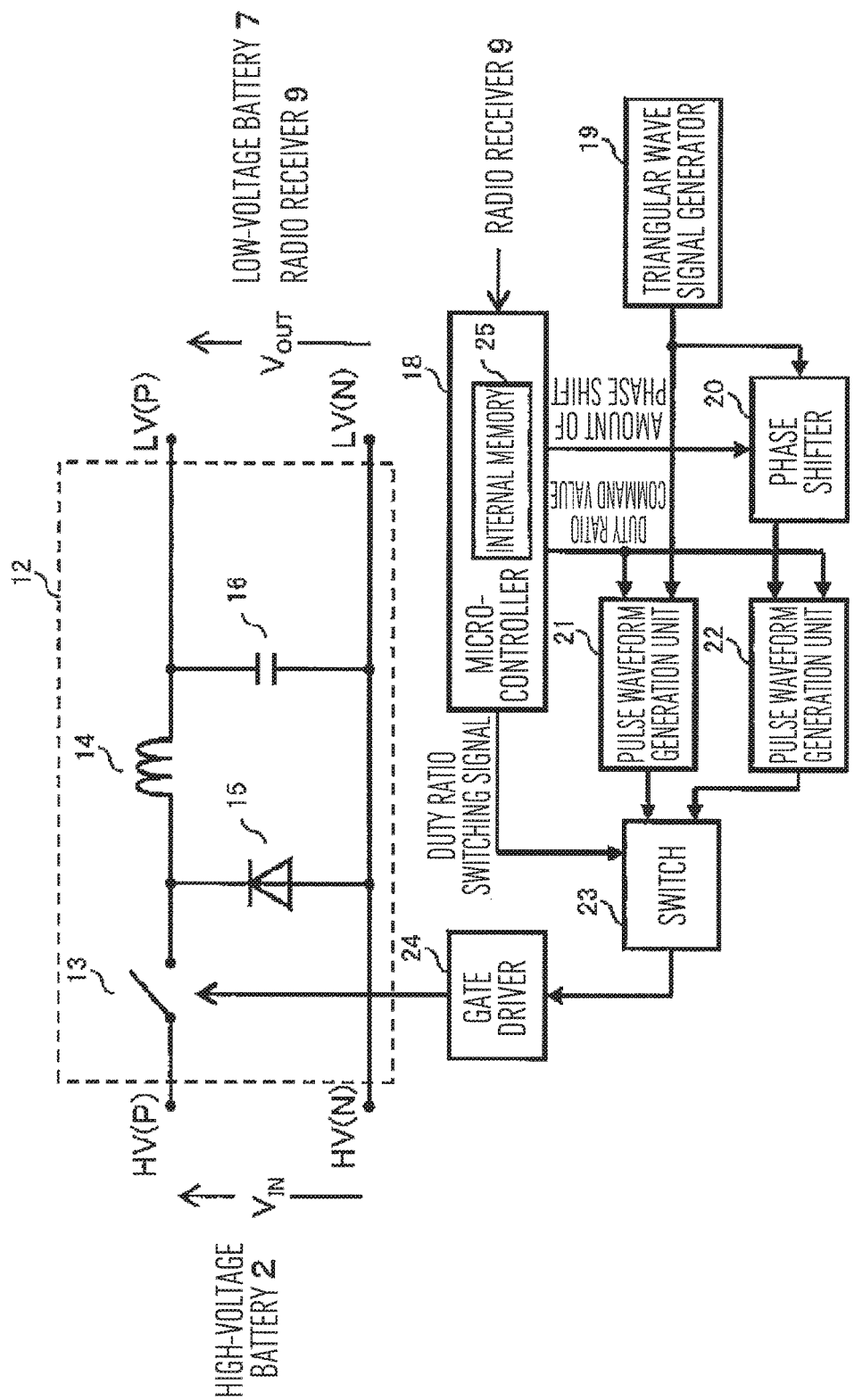
FIG. 2 is a diagram showing the circuit configuration of a DC-DC converter.

Next, the DC-DC converter 8 mounted on the electric vehicle 1 will be explained in terms of its operation. FIG. 2 is a diagram showing the circuit configuration of the DC-DC converter 8. A voltage conversion unit in the DC-DC converter 8 consists of a step-down chopper circuit 12, and comprises a switching element 13 such as a transistor, an inductor 14, a freewheeling diode 15, and a capacitor 16.

The high-voltage battery 2 applies a high voltage $V_{IN}$ of 360-420 V to between HV(P) and HV(N) terminals in the step-down chopper circuit 12. When the switching element 13 repeats turning on and off at a cycle T ($=T_{ON}+T_{OFF}$) [s], during on periods $T_{ON}$ [s] of the switching element 13, the inductor 14 stores energy; during off periods $T_{OFF}$ [s] of the switching element 13, freewheeling current flows through the diode 15 and the inductor 14 discharges energy. A voltage $V_{OUT}$ output to between LV(P) and LV(N) terminals is $T_{ON}/T \times V_{IN}$. Here, the ratio of the on period $T_{ON}$ to the cycle T of the switching element 13 is called a duty ratio. In addition, the capacitor 16 suppresses a short-term fluctuation of the output voltage $V_{OUT}$.

Generally, in the DC-DC converter 8, noise occurs due to the above-described switching control, and it is superposed on the output voltage $V_{OUT}$ of the DC-DC converter 8. Main frequency components of the noise are a switching frequency, which is the inverse of the switching cycle T, and its harmonics.

Noise overlapping with the frequency band of the AM radio broadcast or the FM radio broadcast causes interference with the radio receiver, and causes discomfort to people in the electric vehicle 1 when they listen to the radio. Especially, noise superposed on the output voltage $V_{OUT}$ of the DC-DC converter 8 is noise transmitting on the power line of the radio receiver 9, and has a large impact.

Hereinafter, an explanation will be given of a pulse width modulation (PWM) control scheme capable of selectively reducing the transmission noise made by the DC-DC converter 8 in terms of a radio frequency sub-band being received in the electric vehicle 1.

The switching control of the step-down chopper circuit 12 in the DC-DC converter 8 in FIG. 2 is performed by a microcontroller 18. This switching control involves the microcontroller 18 comprising an internal memory 25, a triangular wave signal generator 19, a phase shifter 20, pulse waveform generation units 21, 22, a switch 23, and a gate driver 24. Furthermore, the embodiment adopts a configuration of the microcontroller 18 comprising the internal memory 25 but the microcontroller 18 may use an external memory.

The microcontroller 18 in the DC-DC converter 8 generates a duty ratio command value on the basis of broadcast station selection frequency information supplied by the radio receiver 9, and supplies it to the pulse waveform generation unit 21 and the pulse waveform generation unit 22. The microcontroller 18 calculates the amount of phase shift for the phase shifter 20 on the basis of the generated duty ratio command value, and supplies it to the phase shifter 20.

The triangular wave signal generator 19 in the DC-DC converter 8 generates a triangular wave signal for generating a PWM control signal for the step-down chopper circuit 12, and supplies it to the pulse waveform generation unit 21 and the phase shifter 20.

Although the present invention does not limit the frequency of the triangular wave signal, the explanation will be given as using, for example, 100 kHz. The phase shifter 20 adjusts the phase of the triangular wave signal supplied by the triangular wave signal generator 19 on the basis of the amount of phase shift supplied by the microcontroller 18, and supplies the resulting signal to the pulse waveform generation unit 22.

The pulse waveform generation unit 21 compares the duty ratio command value supplied by the microcontroller 18 with the triangular wave signal supplied by the triangular wave signal generator 19, outputs a high level if the duty ratio command value is larger, outputs a low level if the duty ratio command value is smaller, and supplies this logical signal to the switch 23.

On the other hand, the pulse waveform generation unit 22 compares the duty ratio command value supplied by the microcontroller 18 with the triangular wave signal supplied by the phase shifter 20, outputs the low level if the duty ratio command value is larger, outputs the high level if the duty ratio command value is smaller, and supplies this logical signal to the switch 23.

The microcontroller 18 in the DC-DC converter 8 has a function to calculate ratios for the switch 23 to select the logical signals from the pulse waveform generation unit 21 and the pulse waveform generation unit 22 on the basis of the predetermined output voltage value $V_{OUT}$ and input voltage value $V_{IN}$ of the DC-DC converter 8. In addition, the internal memory 25 in the microcontroller 18 holds in advance duty ratio switching signals corresponding to the ratios for the switch 23 to select the logical signals from the pulse waveform generation unit 21 and the pulse waveform generation unit 22; the microcontroller 18 reads out a switching signal corresponding to the ratios calculated by the microcontroller 18 from the internal memory 25, and supplies it to the switch 23.

The switch 23 selects either one of the logical signals supplied by the pulse waveform generation unit 21 and the pulse waveform generation unit 22 on the basis of the duty ratio switching signal supplied by the microcontroller 18, and supplies it to the gate driver 24. The gate driver 24 converts the logical signal supplied by the switch 23 into a PWM control signal for controlling the switching element 13, and controls switching of the switching element 13.

An explanation of methods for the microcontroller 18 determining the following in the DC-DC converter 8 will be given in detail with reference to the drawings: the duty ratio command value; the amount of phase shift; and the duty ratio switching signal.

Firstly, the method for the microcontroller 18 determining the duty ratio command value in the DC-DC converter 8 will be explained in detail.

Figure 3A:
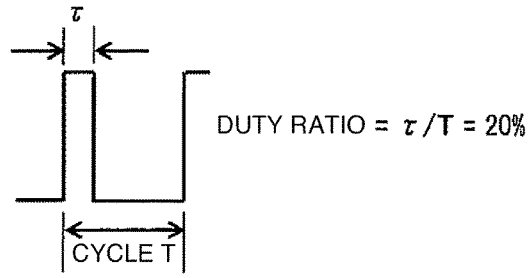
FIG. 3 is a conceptual diagram for explaining the relation of symmetrical duty ratios of PWM control signals.
Figure 3B:
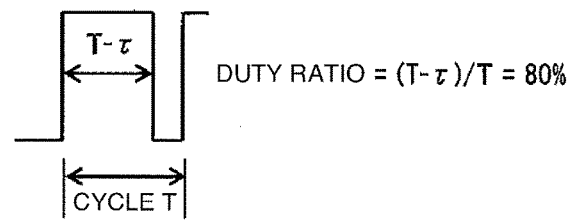

FIG. 3 is a conceptual diagram for explaining the relation of symmetrical duty ratios of PWM control signals. A signal waveform (a) in FIG. 3 indicates PWM control having an on period $\tau$ (off period T-$\tau$) to the cycle T, and indicates, as an example, a case of its duty ratio=20%. On the other hand, a signal waveform (b) in FIG. 3 indicates PWM control having an on period T-$\tau$ (off period T) to the cycle T, and indicates, as an example, a case of the duty ratio=80%. Like the signal waveforms (a) and (b) in FIG. 3, a pair of PWM controls having the relation of on and off periods of PWM control that are interchanged is called symmetrical duty ratios in the embodiments according to the present invention.

FIG. 4 is one example of two PWM control signals having the relation of symmetrical duty ratios explained in FIG. 3. The horizontal axis in FIG. 4 indicates time, and the vertical axis indicates the logical levels of the PWM control signals. A PWM control signal (a) in FIG. 4 indicates a PWM control signal having the on period r to the cycle T, and indicates, as an example, a case of the duty ratio=20%. In addition, a PWM control signal (b) in FIG. 4 indicates a PWM control signal having the on period T-$\tau$ to the cycle T, and indicates, as an example, a case of the duty ratio=80%.

Next, consideration is given to the frequency characteristics of the PWM control signals shown in FIG. 4. FIG. 5 is the frequency characteristics of Fourier series expansion coefficients of the PWM control signals shown in FIG. 4. The horizontal axis indicates the orders of the harmonics of the fundamental repetition frequency (1/T [Hz]) of the PWM control signals, and the vertical axis indicates amplitude at each order.

Figure 4A:
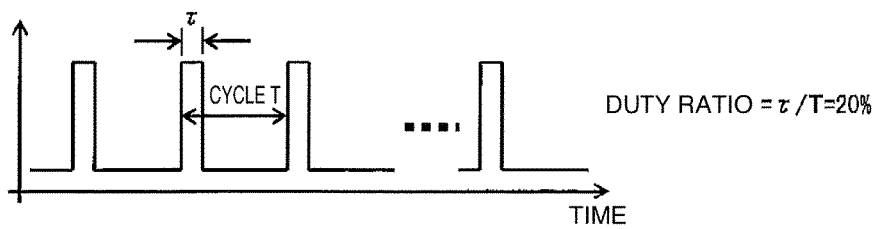
FIG. 4 is one example of two PWM control signals having the relation of symmetrical duty ratios.
Figure 4B:
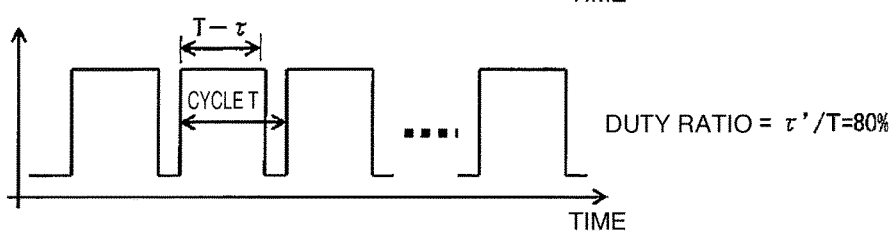
Figure 5A:
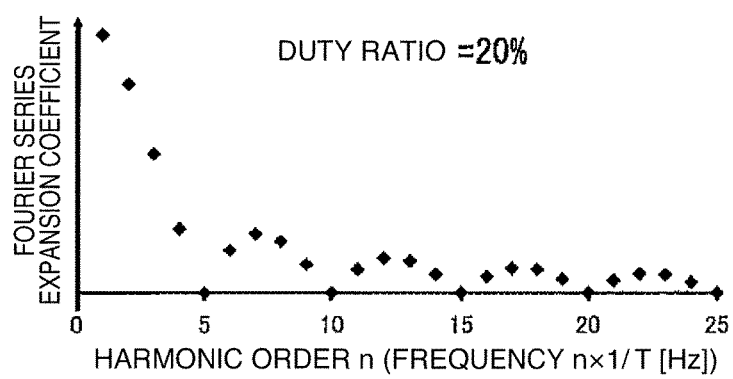
FIG. 5 is frequency characteristics of Fourier series expansion coefficients of the PWM control signals.
Figure 5B:
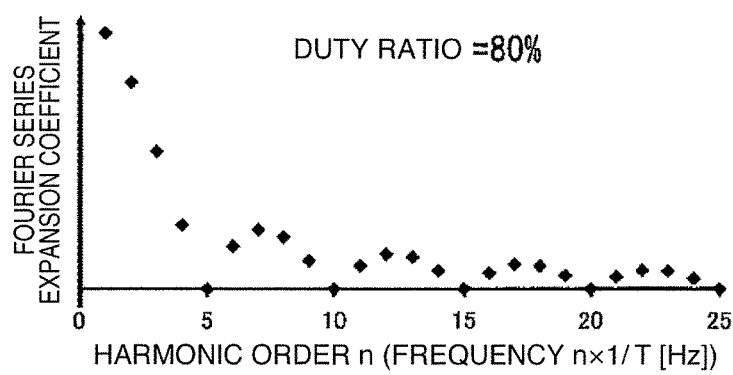

The frequency characteristic (a) of a Fourier series expansion coefficient in FIG. 5 indicates the frequency characteristic in the same case of the duty ratio=20% as that of FIG. 4(a). In addition, the frequency characteristic (b) of a Fourier series expansion coefficient in FIG. 5 indicates the frequency characteristic in the same case of the duty ratio=80% as that of FIG. 4(b).

It is clear from these two frequency characteristics that PWM control signals having the relation of symmetrical duty ratios have the same frequency characteristic. In addition, at a harmonic component at an order corresponding to the inverse of a duty ratio, 1/20%=1/0.2=5th order in the case of FIG. 5, a dip in the frequency characteristic occurs.

In addition, dips in the frequency characteristic occur in the same manner at integral multiples of an order corresponding to the inverse of the duty ratio.

The noise superposed on the output voltage of the DC-DC converter 8 is different in absolute strength indicated in FIG. 5 depending on the characteristic of an output noise filter, but has the same characteristic as that of these PWM control signals in terms of orders at which dips appear.

A PWM control scheme according to the embodiment takes advantage of the frequency characteristic of PWM control signals having the relation of symmetrical duty ratios described above. In particular, the scheme combines two basic waveforms having the relation of symmetrical duty ratios (for example, PWM control signals having a duty ratio of 20% and a duty ratio of 80%), controls the output voltage of the DC-DC converter 8 by an average duty ratio determined by its combination ratio, aligns a dip in a harmonic component appearing at a particular order of the fundamental repetition frequency with a frequency to which the radio receiver 9 in the electric vehicle 1 is tuned in, and thereby reduces interference with the radio receiver 9.

In other words, the duty ratio command value determined by the microcontroller 18 in the DC-DC converter 8 is a command value for determining the combination of symmetrical duty ratios so that the harmonic frequency of the fundamental repetition frequency where a dip in harmonic component appears in the frequency characteristic of two PWM control signals having the relation of symmetrical duty ratios shown in FIG. 5 gets close to a frequency to which the radio receiver 9 in the electric vehicle 1 is tuned in.

Now, an explanation will be given of relation between a frequency band to which the radio receiver 9 in the electric vehicle 1 is tuned in and the combination of used symmetrical duty ratios.

FIG. 6 is a list of frequency sub-bands to which the radio receiver 9 in the electric vehicle 1 is tuned in, the orders of the harmonics at which a dip should be formed in the frequency characteristic, and combinations of used symmetrical duty ratios. Here, it indicates a case of the repetition frequency of the PWM control signals being 100 kHz. When the repetition frequency of the PWM control signals is 100 kHz, harmonic frequencies appear also at intervals of 100 kHz. Therefore, symmetrical duty ratios are determined by sectioning the AM radio band during listening per 100 kHz. Furthermore, the information shown in FIG. 6 is assumed to be stored in the internal memory 25 in the microcontroller 18 as a reference table.

Firstly, the microcontroller 18 in the DC-DC converter 8 obtains frequency information on a radio broadcast being listened to on the radio receiver 9 from the radio receiver 9. For example, if 480 kHz is the frequency of an AM radio broadcast being listened to on the radio receiver 9 in the electric vehicle 1, the microcontroller 18 refers to the table stored in the internal memory 25, and selects a harmonic frequency closest to 480 kHz from numeric values in the table. Here, the microcontroller 18 determines a pair of symmetrical duty ratios so as to form a dip at 500 kHz, the fifth order harmonic of the fundamental repetition frequency of the PWM control signals. The duty ratios forming a dip in the fifth harmonic are the inverse of the order of the harmonic, 1/5=0.2(20%), and its symmetrical duty ratio, 1−0.2=0.8 (80%), as explained with reference to FIG. 5.

Regarding the above-described duty ratios, the duty ratio obtained from the inverse of the order of the harmonic is called a first symmetrical duty ratio, and the duty ratio obtained from "1−the first symmetrical duty ratio" is called a second symmetrical duty ratio. In other words, in the above example, 0.2 (20%) is a first symmetrical duty ratio, and 0.8 (80%) a second symmetrical duty ratio.

For example, if 1179 kHz is the frequency of an AM radio broadcast being listened to on the radio receiver 9 in the electric vehicle 1, the microcontroller 18 refers to the table stored in the internal memory 25, and determines a pair of symmetrical duty ratios so as to form a dip at 1200 kHz, the 12th order harmonic of the fundamental repetition frequency of the PWM control signals. The duty ratios forming a dip in the 12th order harmonic are the inverse of the order of the harmonic, 1/12=8.333 . . . %, and its symmetrical duty ratio, 91.666 . . . %, as explained with reference to FIG. 5.

In the same manner, the combination of a pair of symmetrical duty ratios forming a dip at a frequency sub-band is determined according to the frequency of an AM radio broadcast being listened to on the radio receiver 9 in the electric vehicle 1.

Next, a duty ratio command value is calculated on the basis of the determined pair of symmetrical duty ratios. A calculation method is selected at will, but in the embodiment, the duty ratio command value is a product of a second symmetrical duty ratio and 1 V. For example, if symmetrical duty ratios are a first symmetrical duty ratio 20% and a second symmetrical duty ratio 80%, the duty ratio command value is 1×0.8=0.8 V.

Secondly, the method for the microcontroller 18 determining the amount of phase shift in the DC-DC converter 8 will be explained in detail. The amount of phase shift is for making rise timings the same when generating PWM control signals having a pair of symmetrical duty ratios. In the embodiments according to the present invention, the microcontroller 18 calculates a product of a first symmetrical duty ratio and $2\pi$ as the amount of phase shift, and notifies the phase shifter 21 of it.

Next, an explanation will be given of the method for generating two PWM control signals having the relation of symmetrical duty ratios on the basis of the duty ratio command value and the amount of phase shift determined as described above.

Figure 7A:
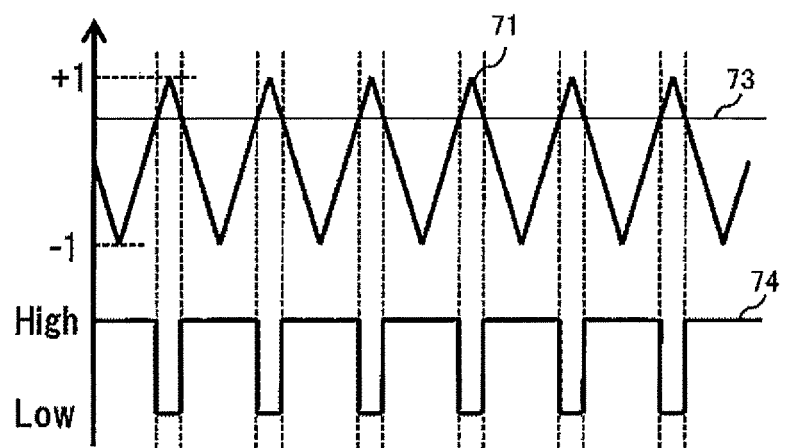
FIG. 7 is a time-waveform diagram for explaining a method for generating two PWM control signals having the relation of symmetrical duty ratios.
Figure 7B:
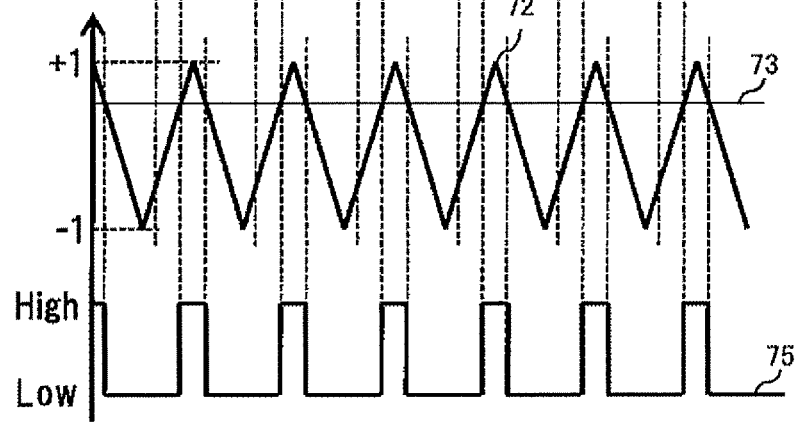

FIG. 7 is a time-waveform diagram for explaining a method for generating two PWM control signals having the relation of symmetrical duty ratios. A time waveform (a) in FIG. 7 indicates a first triangular wave signal 71 generated by the triangular wave signal generator 19, a duty ratio command value 73 supplied by the microcontroller 18, and a PWM control signal 74 generated by the pulse waveform generation unit 21.

On the other hand, a time waveform (b) in FIG. 7 indicates a second triangular wave signal 72 obtained by the phase shifter 20 adjusting the phase of the first triangular wave signal 71 generated by the triangular wave signal generator 19, the duty ratio command value 73 supplied by the microcontroller 18, and a PWM control signal 75 generated by the pulse waveform generation unit 22.

As described above, the pulse waveform generation unit 21 compares the duty ratio command value supplied by the microcontroller 18 with the triangular wave signal supplied by the triangular wave signal generator 19, outputs the high level if the duty ratio command value is larger, outputs the low level if the duty ratio command value is smaller, and supplies this logical signal to the switch 23. For example, if the duty ratio command value supplied by the microcontroller 18 is 0.8 V, i.e. a pair of symmetrical duty ratios is 20% and 80%, the pulse waveform generation unit 21 outputs the PWM control signal 74 having the duty ratio 80%.

In this case, the phase shifter 20 is notified of an amount of phase shift $0.2 \times 2\pi$, and the phase shifter 20 delays the phase of the triangular wave signal 71 supplied by the triangular wave signal generator 19 by $0.2 \times 2\pi$, and supplies the resulting signal as the second triangular wave signal 72 to the pulse waveform generation unit 22.

As described above, the pulse waveform generation unit 22 compares the duty ratio command value supplied by the microcontroller 18 with the triangular wave signal 72 supplied by the phase shifter 20, outputs the low level if the duty ratio command value is larger, outputs the high level if the duty ratio command value is smaller, and supplies this logical signal to the switch 23. For example, if the duty ratio command value supplied by the microcontroller 18 is 0.8 V, i.e. a pair of symmetrical duty ratios is 20% and 80%, the pulse waveform generation unit 22 outputs the PWM control signal 75 having the duty ratio 20%.

According to the above operation, the first PWM control signal 74 having the duty ratio 80% is supplied to the switch 23 by the pulse waveform generation unit 21, and the second PWM control signal 75 having the duty ratio 20% is supplied to the switch 23 by the pulse waveform generation unit 22.

In addition, the rise timing of the first PWM control signal 74 and the rise timing of the second PWM control signal 75 are the same, like those of the PWM control signals shown in FIG. 4.

Thirdly, an explanation will be given of the method for calculating ratios for the switch 23 to select the logical signals from the pulse waveform generation unit 21 and the pulse waveform generation unit 22. The output voltage is determined according to the time averaged duty ratio of the combination of a pair of symmetrical duty ratios determined as described above.

Assuming that the duty ratio of the first PWM control signal 74 is X % and its occurrence rate is Y %—consequently, the duty ratio of the second PWM control signal 75 is (100−X) % and its occurrence rate is (100−Y) %—, the input voltage of the DC-DC converter 8 is $V_{in}$, and its output voltage is $V_{out}$, the microcontroller 18 calculates the occurrence rate Y that satisfies $\{X/100 \times Y/100 + (100-X)/100 \times (100-Y)/100\} \times V_{in} = V_{out}$; thereby, the microcontroller 18 obtains a ratio for the switch 23 to select the logical signal from the pulse waveform generation unit 21.

Lastly, the switch 23 generates a selection pattern for selecting the logical signals supplied by the pulse waveform generation unit 21 and the pulse waveform generation unit 22 on the basis of the duty ratio switching signal supplied by the microcontroller 18, and performs selection processing in synchronization with the rise timing.

FIG. 8 shows examples of the duty ratio switching signals held by the internal memory 25 in the microcontroller 18, and PWM control signals selected by the switch 23 supplied with the duty ratio switching signals. A combination (a) of a duty ratio switching signal and a PWM control signal in FIG. 8 is an example of the duty ratio switching signal and the PWM control signal when 32% is the result of a ratio for the switch 23 to select the logical signal from the pulse waveform generation unit 21, calculated by the microcontroller 18. In the example, pulses having the first symmetrical duty ratio D1=20% appear eight times out often, and pulses having the second symmetrical duty ratio D2=80% appear two times out of ten. The total duty ratio at this time can be calculated by 20%×8/10+80%×2/10, and it is 32%.

A duty ratio switching signal and a PWM control signal (b) in FIG. 8 are examples in which pulses having the first symmetrical duty ratio D1=20% appear five times out often, and pulses having the second symmetrical duty ratio D2=80% appear five times out of ten. The total duty ratio at this time is 50%.

A duty ratio switching signal and a PWM control signal (c) in FIG. 8 are examples in which pulses having the first symmetrical duty ratio D1=20% appear three times out often, and pulses having the second symmetrical duty ratio D2=80% appear seven times out of ten. The total duty ratio at this time is 62%.

In this manner, the switch 23 generates a PWM control signal on the basis of the duty ratio switching signal supplied by the microcontroller 18, and supplies it to the gate driver 24.

The gate driver 24 converts the logical signal supplied by the switch 23 into a PWM control signal for controlling the switching element 13, and controls switching of the switching element 13.

As described above, the DC-DC converter in the embodiment combines two basic waveforms having the relation of symmetrical duty ratios (for example, PWM control signals having the duty ratio 20% and the duty ratio 80%), controls the output voltage of the DC-DC converter 8 by an average duty ratio determined by the combination ratio, aligns a dip in a harmonic component appearing at a particular order of the fundamental repetition frequency with a frequency to which the radio receiver 9 in the electric vehicle 1 is tuned in, and thereby can reduce interference with the radio receiver 9.

Therefore, the present invention can provide a power conversion device capable of selectively suppressing harmonic noise in a target frequency sub-band and a machine equipped with the power conversion device, without increasing their sizes or costs due to addition of a filter or the like.

The embodiment is an example of applying the harmonic noise reduction PWM control scheme and the DC-DC converter using it to an electric vehicle; with a purpose of selectively suppressing harmonic noise in a particular frequency sub-band, the present invention can be applied to a DC-DC converter mounted on a hybrid vehicle, a DC-DC converter mounted on a construction machine, a DC-DC converter mounted on a railcar, and the like.

Embodiment 2

In the embodiment, an explanation will be given of an example of DC-DC converter that has improved performance in following load fluctuation by performing feedback control on the basis of the output voltage of the DC-DC converter.

Figure 9:
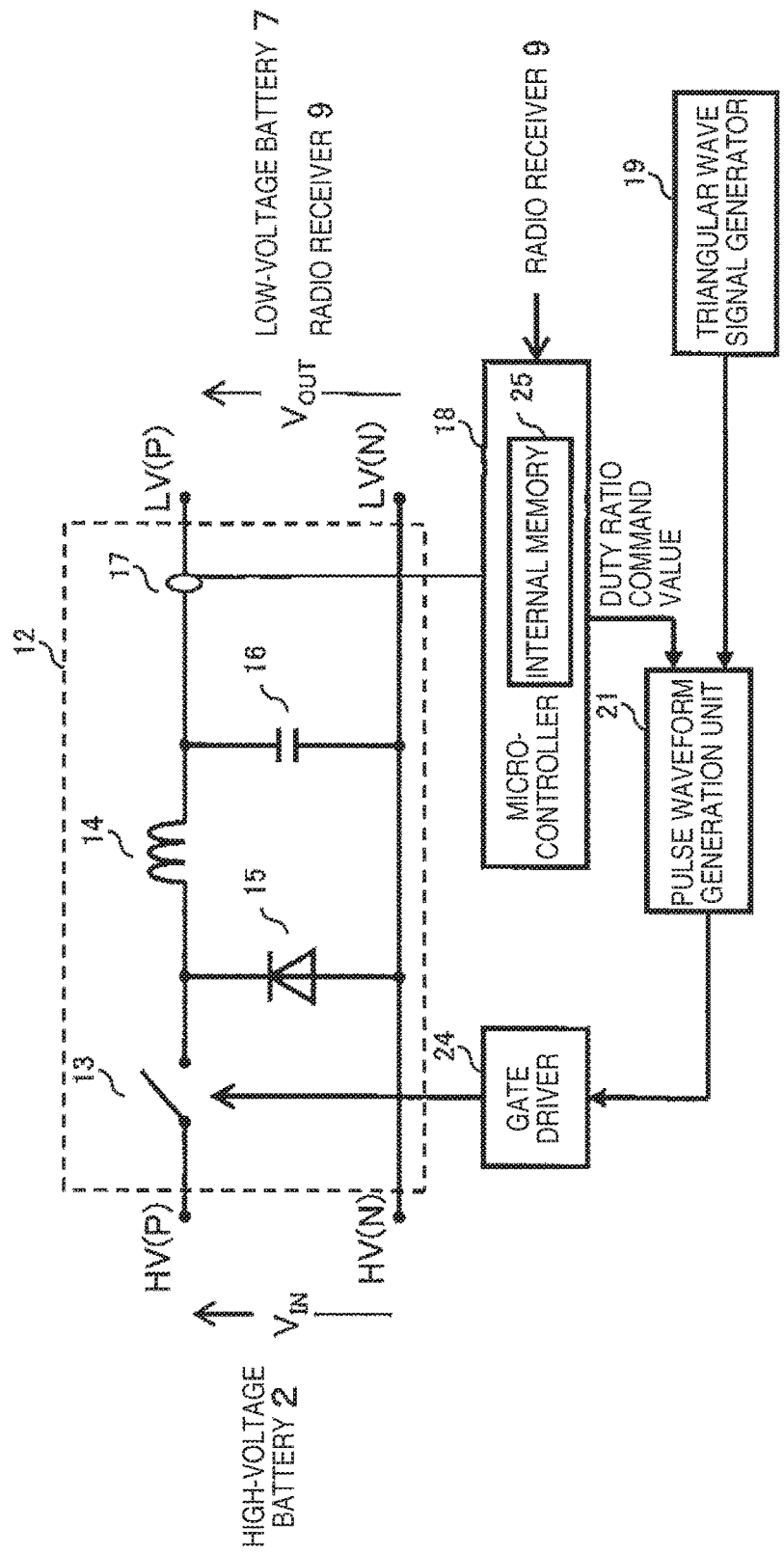
FIG. 9 is an example of PWM control signal for controlling a switching element according to a conventional PWM control scheme.

FIG. 9 is an example of configuration diagram of a DC-DC converter 8 in the embodiment 2. In the DC-DC converter 8 in FIG. 9, explanations will be omitted regarding components denoted by the same reference characters and parts having the same functions as those already explained in FIG. 2.

The difference between the DC-DC converter 8 in FIG. 2 and the DC-DC converter 8 in FIG. 9 is a voltage sensor 17 for detecting the output voltage of the DC-DC converter 8, and the control method in the microcontroller 18.

The microcontroller 18 in FIG. 9 automatically obtains a present output voltage value from the voltage sensor 17 at a regular timing. In the same manner as that of the first embodiment, the microcontroller 18 obtains frequency information on a broadcast station to which the radio receiver 9 in the electric vehicle 1 is tuned in, and obtains candidate duty ratios from a symmetrical duty ratio list stored in the internal memory 25.

For example, if 1179 kHz is the frequency of an AM radio broadcast being listened to on the radio receiver 9 in the electric vehicle 1, the microcontroller 18 refers to the table stored in the internal memory 25, and determines a pair of symmetrical duty ratios so as to form a dip at 1200 kHz, the 12th order harmonic of the fundamental repetition frequency of the PWM control signals.

The duty ratios forming a dip at the 12th order harmonic are the inverse of the order of the harmonic, 1/12=8.333 . . . %, and its symmetrical duty ratio, 91.666 . . . %, as explained with reference to FIG. 5.

Then, the microcontroller 18 compares a voltage value obtained from the voltage sensor 17 with a voltage value which should be output, selects the second symmetrical duty ratio from the combination of symmetrical duty ratios if the voltage value obtained from the voltage sensor 17 is smaller, selects the first symmetrical duty ratio if the voltage value which is being output is larger, and supplies it here as a duty ratio command value to the pulse waveform generation unit 21.

The pulse waveform generation unit 21 compares the duty ratio command value supplied by the microcontroller 18 with the triangular wave signal supplied by the triangular wave signal generator 19, outputs the high level if the duty ratio command value is larger, outputs the low level if the duty ratio command value is smaller, and supplies this logical signal to the gate driver 24.

Controlling the switching element 13 in the same manner as that of the first embodiment after this enables the embodiment to provide a PWM control scheme that has improved performance in following load fluctuation, and a DC-DC converter using it.

The invention is not limited to the above-described embodiments, but includes various modifications. For example, the above-described embodiments are explained in detail in order to intelligibly explain the present invention, and the present invention is not always limited to those comprising all the explained configurations. In addition, it is possible to replace part of the configuration in one embodiment with the configuration in another embodiment, and also possible to add the configuration in one embodiment to the configuration in another embodiment. Furthermore, it is possible to add, remove, or replace another configuration regarding part of the configuration in each embodiment.

The above-described configurations, functions, processing units, processing means, and the like may be realized with hardware, for example, by designing part or all of them using integrated circuits. Also, the above described configurations, functions, and the like may be realized with software by a processor interpreting and executing programs enabling the respective functions. Information, such as programs, tables, and files, that enables the functions can be stored in a recording device, such as a memory, a hard disk, and an SSD (Solid State Drive), or a recording medium, such as an IC card, an SD card, and a DVD.

Control lines and information lines are shown only if those are considered necessary for explanation, and all the control lines and information lines of a product are not always shown. In fact, it is safe to consider that almost all components are connected with each other.

REFERENCE SIGNS LIST

1 Electric vehicle
2 High-voltage battery
3 Inverter
4 Motor

5 Driving force transmission unit
6 Drive wheel
7 Low-voltage battery
8 DC-DC converter
9 Radio receiver
10 Speaker
11 Reception antenna
12 Step-down chopper
13 Switching element
14 Inductor
15 Freewheeling diode
16 Capacitor
17 Voltage sensor
18 Microcontroller
19 Triangular wave signal generator
20 Phase shifter
21, 22 Pulse waveform generation unit
23 Switch
24 Gate driver
25 Internal memory

The invention claimed is:

1. A power conversion device comprising:
a switching element;
a switching signal generation unit for generating a switching control signal for controlling turning on/off the switching element; and
a control unit,
wherein the switching control signal generation unit generates the switching control signal comprising a combination of a pair of symmetrical pulse waveforms having on and off periods that are interchanged with respect to a repeated cycle.

2. The power conversion device according to claim 1, wherein
the switching signal generation unit includes:
a first pulse waveform generation unit for outputting a first pulse waveform of the pair of pulse waveforms; and
a second pulse waveform generation unit for outputting a second pulse waveform of the pair of pulse waveforms,
wherein the control unit determines symmetrical duty ratios of the pair of pulse waveforms on the basis of frequency information input from an outside, controls the first pulse waveform generation unit and the second pulse waveform generation unit on the basis of the duty ratios, and generates the pair of pulse waveforms.

3. The power conversion device according to claim 2, wherein the control unit determines a combination ratio of the pair of pulse waveforms on the basis of the duty ratios, controls the switching control signal generation unit on the basis of the combination ratio, and generates a switching control signal.

4. The power conversion device according to claim 2, wherein
the switching signal generation unit includes a triangular wave signal generation unit,
wherein the first pulse waveform generation unit and the second pulse waveform generation unit generate pulse waveforms on the basis of a triangular wave signal output by the triangular wave signal generation unit and a command value, output by the control unit, for generating the duty ratios.

5. The power conversion device according to claim 4, further including
a phase shift unit for shifting phase of the triangular wave signal output by the triangular wave signal generation unit,
wherein the phase shift unit shifts the phase of the triangular wave signal output by the triangular wave signal generation unit on the basis of an amount of phase shift input from the control unit, and outputs a resulting signal to the second pulse waveform generation unit.

6. The power conversion device according to claim 4, further including
a voltage sensor for detecting output voltage after power conversion,
wherein the control unit compares a voltage value obtained by the voltage sensor with a preset output voltage value, selects a duty ratio having a lower rate of a high level from the symmetrical duty ratios if the voltage value obtained by the voltage sensor is larger, selects a duty ratio having a higher rate of the high level from the symmetrical duty ratios if the voltage value obtained by the voltage sensor is smaller, generates a command value for generating the duty ratio, and outputs the command value to the first pulse waveform generation unit and the second pulse waveform generation unit to generate the pulse waves.

7. A machine equipped with the power conversion device according to claim 1.

8. A machine equipped with the power conversion device according to claim 2.

9. The machine according to claim 8 comprising:
a radio receiver,
wherein the radio receiver outputs frequency information on a broadcast station to which the radio receiver is tuned to the control unit in the power conversion device; and
the control unit determines the symmetrical duty ratios of the pair of pulse waveforms on the basis of the input frequency information, and controls the first pulse waveform generation unit and the second pulse waveform generation unit on the basis of the duty ratios to generate the pair of pulse waveforms.

* * * * *